US012588085B2

(12) United States Patent
Balmakhtar et al.

(10) Patent No.: US 12,588,085 B2
(45) Date of Patent: Mar. 24, 2026

(54) PLATFORM INDEPENDENT CLIENT FRAMEWORK

(71) Applicant: T-Mobile Innovations LLC, Overland Park, KS (US)

(72) Inventors: Marouane Balmakhtar, Fairfax, VA (US); Brian David Waters, Angel Fire, NM (US); Lyle T. Bertz, Lee's Summit, MO (US)

(73) Assignee: T-Mobile Innovations LLC, Overland Park, KS (US)

( * ) Notice: Subject to any disclaimer, the term of this patent is extended or adjusted under 35 U.S.C. 154(b) by 767 days.

(21) Appl. No.: 17/825,355

(22) Filed: May 26, 2022

(65) Prior Publication Data

US 2023/0389093 A1        Nov. 30, 2023

(51) Int. Cl.
*H04W 76/12* (2018.01)
*H04W 80/06* (2009.01)
*H04W 88/14* (2009.01)

(52) U.S. Cl.
CPC ............ *H04W 76/12* (2018.02); *H04W 80/06* (2013.01); *H04W 88/14* (2013.01)

(58) Field of Classification Search
CPC ...... H04W 76/12; H04W 80/06; H04W 88/14
See application file for complete search history.

(56) References Cited

U.S. PATENT DOCUMENTS

| | | | | |
|---|---|---|---|---|
| 9,277,580 | B2 * | 3/2016 | Ji | H04W 76/16 |
| 11,463,527 | B2 * | 10/2022 | Rommer | H04W 12/033 |
| 11,510,058 | B2 * | 11/2022 | Wu | H04W 76/12 |
| 11,943,135 | B2 * | 3/2024 | Salkintzis | H04L 47/805 |
| 11,985,501 | B2 * | 5/2024 | Balmakhtar | H04W 76/10 |
| 12,156,023 | B2 * | 11/2024 | Payyappilly | H04W 12/0471 |
| 2023/0078563 | A1 * | 3/2023 | Salkintzis | H04W 60/04 |
| | | | | 455/435.1 |
| 2023/0080836 | A1 * | 3/2023 | Vahidi Mazinani | H04W 60/06 |
| | | | | 455/435.1 |
| 2023/0389093 | A1 * | 11/2023 | Balmakhtar | H04W 76/12 |
| 2024/0236906 | A1 * | 7/2024 | Salkintzis | H04W 12/06 |

* cited by examiner

*Primary Examiner* — Charles C Jiang
(74) *Attorney, Agent, or Firm* — SHOOK, HARDY & BACON L.L.P.

(57) ABSTRACT

Systems and methods are provided herein to implement a platform independent client framework, which may also be known as a universal software stack. A computer-implemented method for may be used when seeking to connect a device without a 5G radio, such as a 3GPP device, to a 5G network. The device seeking to connect to the 5G network sends a connection request message to the platform independent client framework. Based on the connection request message, the platform independent client framework requests a platform specific adapter, which is then used to create an adapted message. The platform independent client framework then encapsulates the adapted message. The adapted message is then encapsulated to create a first encapsulated message. The first encapsulated message is then encapsulated in an internet protocol security protocol to create a second encapsulated message. The second encapsulated message is then transmitted to the 5G network.

20 Claims, 5 Drawing Sheets

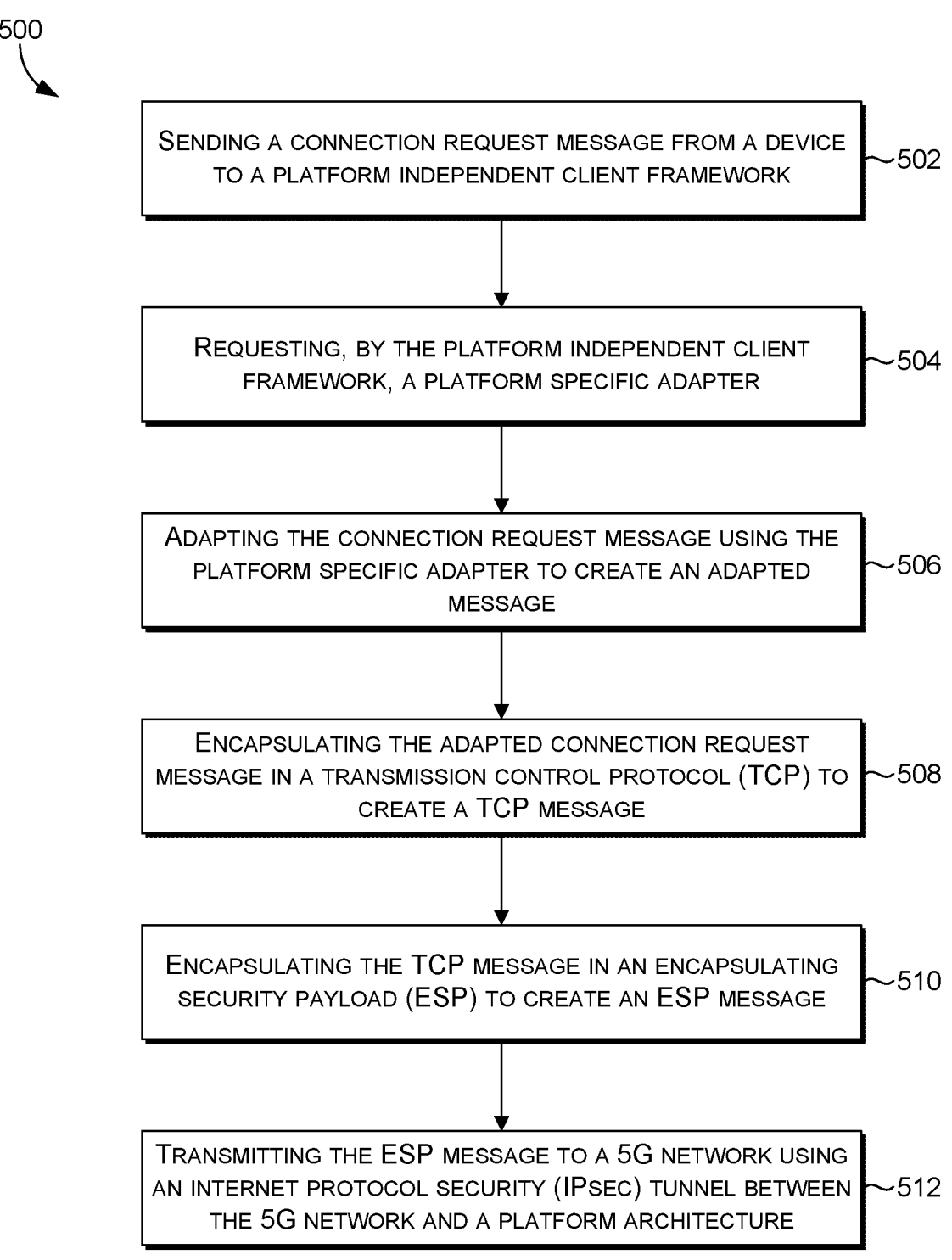

500

SENDING A CONNECTION REQUEST MESSAGE FROM A DEVICE TO A PLATFORM INDEPENDENT CLIENT FRAMEWORK ~502

REQUESTING, BY THE PLATFORM INDEPENDENT CLIENT FRAMEWORK, A PLATFORM SPECIFIC ADAPTER ~504

ADAPTING THE CONNECTION REQUEST MESSAGE USING THE PLATFORM SPECIFIC ADAPTER TO CREATE AN ADAPTED MESSAGE ~506

ENCAPSULATING THE ADAPTED CONNECTION REQUEST MESSAGE IN A TRANSMISSION CONTROL PROTOCOL (TCP) TO CREATE A TCP MESSAGE ~508

ENCAPSULATING THE TCP MESSAGE IN AN ENCAPSULATING SECURITY PAYLOAD (ESP) TO CREATE AN ESP MESSAGE ~510

TRANSMITTING THE ESP MESSAGE TO A 5G NETWORK USING AN INTERNET PROTOCOL SECURITY (IPSEC) TUNNEL BETWEEN THE 5G NETWORK AND A PLATFORM ARCHITECTURE ~512

FIG. 5

PLATFORM INDEPENDENT CLIENT FRAMEWORK

BACKGROUND 5G systems are more modular and provide increased network security to users. These factors have led vendors to create more products designed to connect with a 5G network. The advantages of the 5G network have also led to the desire to connect other devices, to the network, such as appliances, as part of the Internet of Things (IoT). While mobile devices, such as cell phones, which may also be known as user equipment (UE), have capabilities that may facilitate connecting to the 5G network, however, connecting other devices is not as straightforward and may not even be possible because these devices may not incorporate a 5G radio. The complexity of 5G standards and the different implementations of device vendors based on customer needs and requirements further complicate interoperability. The software stack of these devices becomes more complicated as the software device stack is difficult to adapt to a new target platform in the host device environment. Aspects described herein provide a platform independent client framework that facilitates interoperability with a 5G network.

SUMMARY

A high-level overview of various aspects of the present technology is provided in this section to introduce a selection of concepts that are further described below in the detailed description section of this disclosure. This summary is not intended to identify key or essential features of the claimed subject matter, nor is it intended to be used as an aid in isolation to determine the scope of the claimed subject matter.

According to aspects herein, methods and systems for implementing a platform independent client framework, which may also be known as a universal software stack. An aspect of the present disclosure provides a computer-implemented method for connecting to a 5G network. The method may be used when seeking to connect a device without a 5G radio, such as a 3GPP device, to a 5G network. The method begins when the device seeking to connect to the 5G network sends a connection request message to the platform independent client framework. Based on the connection request message, the platform independent client framework requests a platform specific adapter. The platform independent client framework then adapts the connection request message using the platform specific adapter to create an adapted message. Once the adapted message has been created the platform independent client framework encapsulates the adapted connection request message in a transmission control protocol (TCP) message, creating a TCP message. The TCP message is then encapsulated in an encapsulating security payload to create an ESP message. The ESPT message is then transmitted to the 5G network using an internet protocol security (IPsec) tunnel between the 5G network and a platform architecture.

A further aspect of the disclosure provides a system for connecting to a 5G network. The system includes a 5G network having an access point and a device seeking to connect with the access point. The device incorporates a platform independent client frame work which is configured to send a connection request message from the device. The platform independent client frame work then requests a platform specific adapter, based on the platform host operating system. The connection request message is then adapted using the platform specific adapter to create an adapted message. The adapted message is then encapsulated in a transmission control protocol (TCP) to create a TCP message. The TCP message is then encapsulated in an encapsulating security payload (ESP) message to create an ESP message. The ESP message is then transmitted to the 5G network using an internet protocol security (IPsec) tunnel between the 5G network and a platform architecture.

A still further aspect of the disclosure provides a non-transitory computer storage media storing computer-useable instructions that, when used by one or more processors, cause the one or more processors to receive a connection request from a device at a platform independent client framework. The platform independent client framework then requests a platform specific adapter. The adapter is then used by the platform independent client framework to create an adapted message. The adapted message is then encapsulated to create a first encapsulated message. The first encapsulating message is then further encapsulated in an encapsulating security protocol to create a second encapsulated message. The second encapsulated message is then transmitted to the 5G network.

The present systems and methods address the shortcomings of current and old methods of planning and implementing network expansion by harnessing the UE data collected from a plurality of user equipment (UEs) and implementing computerized algorithms to efficiently optimize network expansion of a network carrier. Particularly, the present systems are more efficient than older systems because they allow a network carrier to access greater numbers of geographic locations because the necessity for presence based drive by network tests are reduced or eliminated.

BRIEF DESCRIPTION OF THE SEVERAL VIEWS OF THE DRAWINGS

Implementations of the present disclosure are described in detail below with reference to the attached drawing figures, wherein:

FIG. 5 is a flow diagram of a method for connecting a device to a 5G network using the platform independent client framework, in accordance with aspects herein.

DETAILED DESCRIPTION

Figure 1:
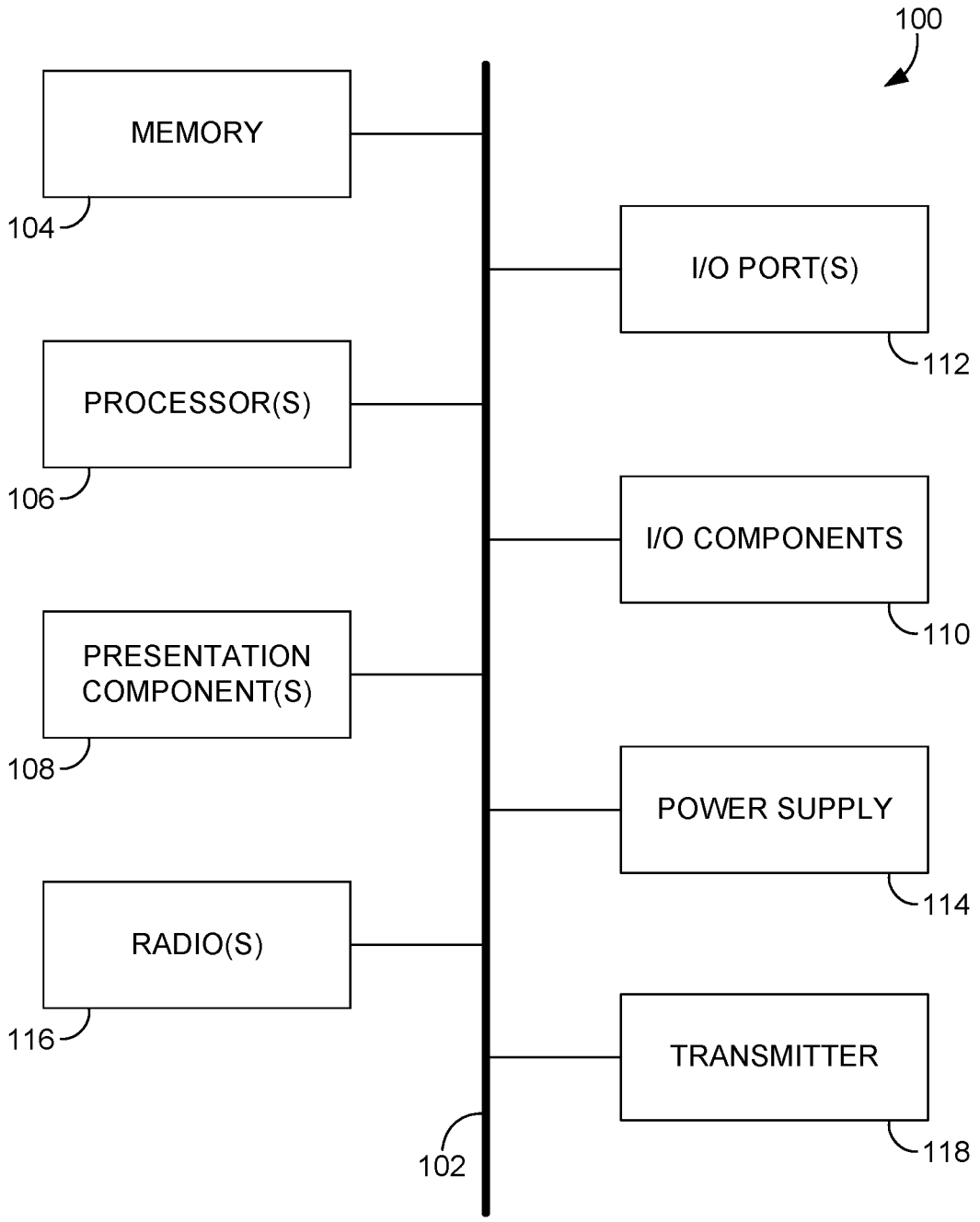
FIG. 1 depicts a diagram of an exemplary network environment in which implementations of the present disclosure may be employed, in accordance with aspects herein.

The subject matter of embodiments of the invention is described with specificity herein to meet statutory requirements. However, the description itself is not intended to limit the scope of this patent. Rather, the inventors have contemplated that the claimed subject matter might be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Throughout this disclosure, several acronyms and shorthand notations are employed to aid the understanding of certain concepts pertaining to the associated system and services. These acronyms and shorthand notations are intended to help provide an easy methodology of communicating the ideas expressed herein and are not meant to limit the scope of embodiments described in the present disclosure. Various technical terms are used throughout this description. An illustrative resource that fleshes out various aspects of these terms can be found in Newton's Telecom Dictionary, 25th Edition (2009).

Embodiments of the present technology may be embodied as, among other things, a method, system, or computer-program product. Accordingly, the embodiments may take the form of a hardware embodiment, or an embodiment combining software and hardware. An embodiment takes the form of a computer-program product that includes computer-useable instructions embodied on one or more computer-readable media.

Computer-readable media include both volatile and non-volatile media, removable and nonremovable media, and contemplate media readable by a database, a switch, and various other network devices. Network switches, routers, and related components are conventional in nature, as are means of communicating with the same. By way of example, and not limitation, computer-readable media comprise computer-storage media and communications media.

Computer-storage media, or machine-readable media, include media implemented in any method or technology for storing information. Examples of stored information include computer-useable instructions, data structures, program modules, and other data representations. Computer-storage media include, but are not limited to RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These memory components can store data momentarily, temporarily, or permanently.

Communications media typically store computer-useable instructions—including data structures and program modules—in a modulated data signal. The term "modulated data signal" refers to a propagated signal that has one or more of its characteristics set or changed to encode information in the signal. Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

By way of background, a traditional telecommunications network employs a plurality of base stations (i.e., access point, node, cell sites, cell towers) to provide network coverage. The base stations are employed to broadcast and transmit transmissions to user devices of the telecommunications network. An access point may be considered to be a portion of a base station that may comprise an antenna, a radio, and/or a controller. In aspects, an access point is defined by its ability to communicate with a user equipment (UE), such as a wireless communication device (WCD), according to a single protocol (e.g., 3G, 4G, LTE, 5G, and the like); however, in other aspects, a single access point may communicate with a UE according to multiple protocols. As used herein, a base station may comprise one access point or more than one access point. Factors that can affect the telecommunications transmission include, e.g., location and size of the base stations, and frequency of the transmission, among other factors. The base stations are employed to broadcast and transmit transmissions to user devices of the telecommunications network. Traditionally, the base station establishes uplink (or downlink) transmission with a mobile handset over a single frequency that is exclusive to that particular uplink connection (e.g., an LTE connection with an EnodeB). In this regard, typically only one active uplink connection can occur per frequency. The base station may include one or more sectors served by individual transmitting/receiving components associated with the base station (e.g., antenna arrays controlled by an EnodeB). These transmitting/receiving components together form a multi-sector broadcast arc for communication with mobile handsets linked to the base station.

As used herein, UE (also referenced herein as a user device or a wireless communication device) can include any device employed by an end-user to communicate with a wireless telecommunications network. A UE can include a mobile device, a mobile broadband adapter, a fixed location or temporarily fixed location device, or any other communications device employed to communicate with the wireless telecommunications network. For an illustrative example, a UE can include cell phones, smartphones, tablets, laptops, small cell network devices (such as micro cell, pico cell, femto cell, or similar devices), and so forth. Further, a UE can include a sensor or set of sensors coupled with any other communications device employed to communicate with the wireless telecommunications network; such as, but not limited to, a camera, a weather sensor (such as a rain gage, pressure sensor, thermometer, hygrometer, and so on), a motion detector, or any other sensor or combination of sensors. A UE, as one of ordinary skill in the art may appreciate, generally includes one or more antennas coupled to a radio for exchanging (e.g., transmitting and receiving) transmissions with a nearby base station or access point.

UEs are not the only devices that access the 5G network. Other devices, such as smart appliances, home devices, etc., may also be desirable to connect to the network. Such devices are non-3GPP devices and use a different software stack. The different non-3GPP software stack requires more effort before these devices can adapt to various target platforms. The target platforms may include Ubuntu, OpenWRT, MCUs, etc.

In accordance with aspects herein, a platform independent client framework, also known as a universal software stack, that adapts to various target platforms. The platform independent client framework incorporates an independent software stack with a set of platform adapters that interact with the associated plug-ins or drivers. The software adapters adapt messages flowing between different target platform implementations. This addresses a need to connect non-UE devices for untrusted non-3GPP access to a 5G core network and also increases interoperability. The platform independent client framework can eliminate the special non-UE device implementations currently needed to connect non-UE devices that do not incorporate a 5G radio to the 5G core network.

Aspects of the disclosure provide a platform independent client framework, a software stack that is global for software stack variations. The software stack is designed to connect using platform adapters that are specific to each host operating system or platform. As an example, a Ubuntu operating system has its own internet key exchange (Ikev2) adapter, while another operating system, such as FreeRTOS has another, different Ikev2 adapter. All of the supported adapters may form a part of the software stack. Each adapter is activated only when the platform it supports is activated. Each platform has its own supported drivers or plug-ins that are available to integrate with the software stack adapters.

In accordance with a first aspect of the present disclosure, a computer-implemented method for connecting to a 5G network is provided. The method begins when a device sends a connection request message to a platform independent client framework. The platform independent client framework then requests a platform specific adapter. The platform specific adapter is then used with the connection request message to create an adapted message. The adapted message is then encapsulated in a transmission control protocol (TCP) to create a TCP message. The TCP message is then encapsulated in an encapsulating security payload (ESP) message, creating an ESP message, which is then transmitted to the 5G network using a tunnel. In accordance with a second aspect of the present disclosure, a system for connecting to a 5G network is provided. The system may allow a non-5G radio equipped device to access the security benefits of the 5G network. The system includes a 5G network with an access point. The device seeking to establish a connection with the 5G network accesses a platform independent client framework. The platform independent client framework is configured to receive a connection request message from the device. The platform independent client framework then requests a platform specific adapter that is compatible with the platform host operating system. The connection request message is then adapted using the platform specific adapter, creating an adapted message. The adapted message is then encapsulated in a transmission control protocol (TCP) to create a TCP message. The TCP message is then encapsulated in an encapsulating security payload (ESP) to create an ESP message. The ESP message is then transmitted to the 5G network using an internet protocol security (IPsec) tunnel between the 5G network and a platform architecture.

Another aspect of the present disclosure is directed to a non-transitory computer storage media storing computer-useable instructions that, when used by one or more processors, cause the one or more processors to receive a connection request from a device at a platform independent client framework. The platform independent client framework then requests a platform specific adapter, which is then used to create an adapted message based on the connection request message. The adapted message is then encapsulated to create a first encapsulated message. The first encapsulated message is then encapsulated in an encapsulating security protocol to create a second encapsulated message. The second encapsulated message is then transmitted to the 5G network.

Turning to FIG. 1, a diagram is depicted of an exemplary computing environment suitable for use in implementations of the present disclosure. In particular, the exemplary computer environment is shown and designated generally as computing device 100. Computing device 100 is but one example of a suitable computing environment and is not intended to suggest any limitation as to the scope of use or functionality of the invention. Neither should computing device 100 be interpreted as having any dependency or requirement relating to any one or combination of components illustrated. In aspects, the computing device 100 may be a UE, or other user device, capable of two-way wireless communications with an access point. Some non-limiting examples of the computing device 100 include a cell phone, tablet, pager, personal electronic device, wearable electronic device, activity tracker, desktop computer, laptop, PC, and the like.

The implementations of the present disclosure may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Implementations of the present disclosure may be practiced in a variety of system configurations, including handheld devices, consumer electronics, general-purpose computers, specialty computing devices, etc. Implementations of the present disclosure may also be practiced in distributed computing environments where tasks are performed by remote-processing devices that are linked through a communications network.

With continued reference to FIG. 1, computing device 100 includes bus 102 that directly or indirectly couples the following devices: memory 104, one or more processors 106, one or more presentation components 108, input/output (I/O) ports 112, I/O components 110, radio 116, transmitter 118, and power supply 114. Bus 102 represents what may be one or more busses (such as an address bus, data bus, or combination thereof). Although the devices of FIG. 1 are shown with lines for the sake of clarity, in reality, delineating various components is not so clear, and metaphorically, the lines would more accurately be grey and fuzzy. For example, one may consider a presentation component such as a display device to be one of I/O components 110. Also, processors, such as one or more processors 106, have memory. The present disclosure hereof recognizes that such is the nature of the art, and reiterates that FIG. 1 is merely illustrative of an exemplary computing environment that can be used in connection with one or more implementations of the present disclosure. Distinction is not made between such categories as "workstation," "server," "laptop," "handheld device," etc., as all are contemplated within the scope of FIG. 1 and refer to "computer" or "computing device."

Computing device 100 typically includes a variety of computer-readable media. Computer-readable media can be any available media that can be accessed by computing device 100 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media does not comprise a propagated data signal.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 104 includes computer-storage media in the form of volatile and/or nonvolatile memory. Memory 104 may be removable, nonremovable, or a combination thereof. Exemplary memory includes solid-state memory, hard drives, optical-disc drives, etc. Computing device 100 includes one or more processors 106 that read data from various entities such as bus 102, memory 104 or I/O components 110. One or more presentation components 108 present data indications to a person or other device. Exemplary one or more presentation components 108 include a display device, speaker, printing component, vibrating component, etc. I/O ports 112 allow computing device 100 to be logically coupled to other devices including I/O components 110, some of which may be built into computing device 100. Illustrative I/O components 110 include a microphone, joystick, game pad, satellite dish, scanner, printer, wireless device, etc.

The radio 116 represents one or more radios that facilitate communication with a wireless telecommunications network. While a single radio 116 is shown in FIG. 1, it is contemplated that there may be more than one radio 116 coupled to the bus 102. In aspects, the radio 116 utilizes a transmitter 118 to communicate with the wireless telecommunications network. It is expressly conceived that a computing device with more than one radio 116 could facilitate communication with the wireless telecommunications network via both the first transmitter 118 and an additional transmitters (e.g. a second transmitter). Illustrative wireless telecommunications technologies include CDMA, GPRS, TDMA, GSM, and the like. The radio 116 may additionally or alternatively facilitate other types of wireless communications including Wi-Fi, WiMAX, LTE, 3G, 4G, LTE, 5G, NR, VoLTE, or other VoIP communications. As can be appreciated, in various embodiments, radio 116 can be configured to support multiple technologies and/or multiple radios can be utilized to support multiple technologies. A wireless telecommunications network might include an array of devices, which are not shown so as to not obscure more relevant aspects of the invention. Components such as a base station, a communications tower, or even access points (as well as other components) can provide wireless connectivity in some embodiments.

Figure 2:
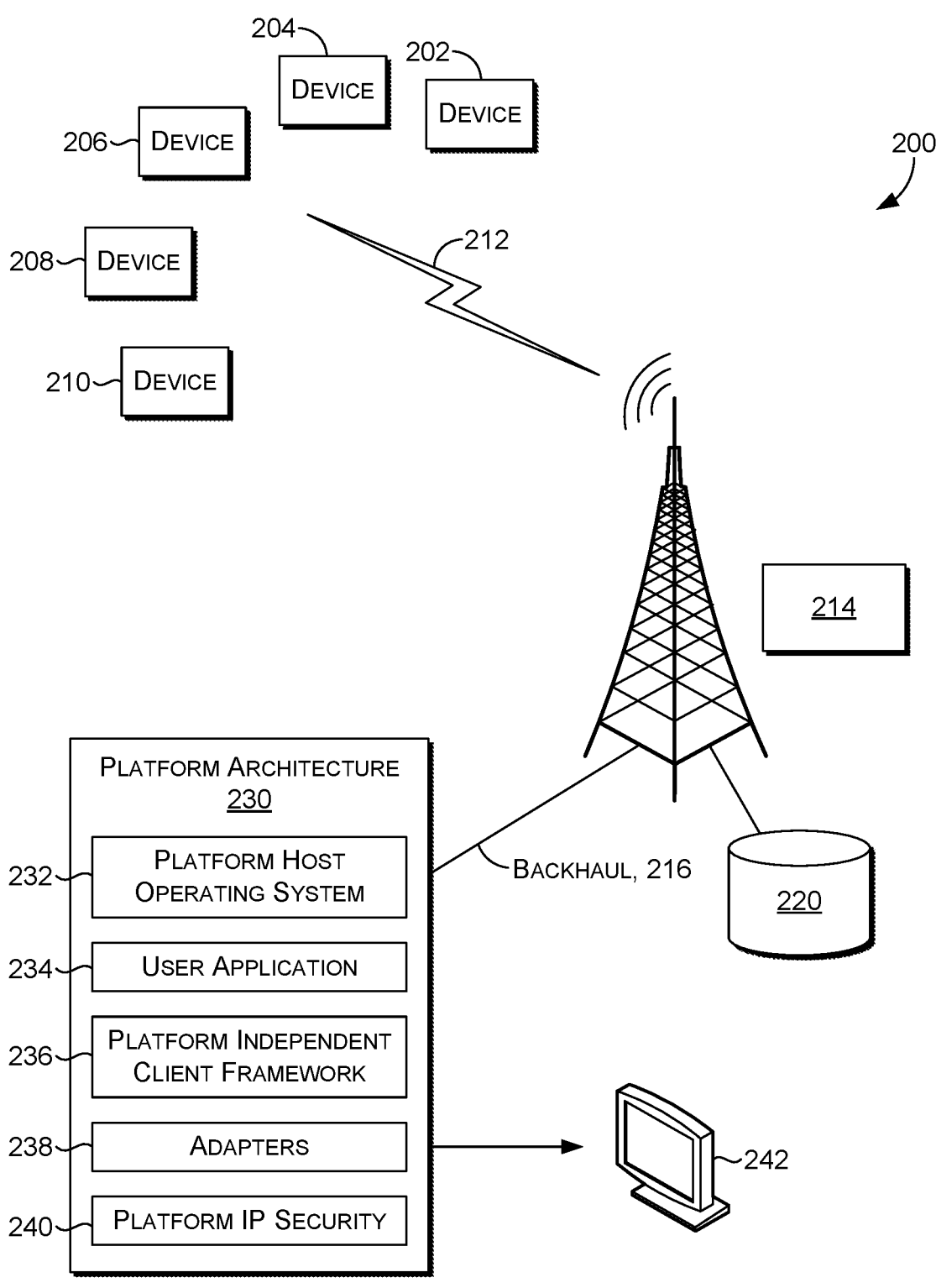
FIG. 2 depicts a computing environment suitable for use in implementations of the present disclosure, in accordance with aspects herein.

FIG. 2 provides an exemplary network environment in which implementations of the present disclosure may be employed. Such a network environment is illustrated and designated generally as network environment 200. Network environment 200 is not to be interpreted as having any dependency or requirement relating to any one or combination of components illustrated.

Network environment 200 includes devices 202, 204, 206, 208, and 210, access point 214 (which may be a cell site, base station, or the like), and one or more communication channels 212. In network environment 200, devices may take on a variety of forms, such as a personal computer (PC), a user device, a smart phone, a smart watch, a laptop computer, a mobile phone, a mobile device, a tablet computer, a wearable computer, a personal digital assistant (PDA), a server, a CD player, an MP3 player, a global positioning system (GPS) device, a video player, a handheld communications device, a workstation, a router, a hotspot, and any combination of these delineated devices, or an internet of things device, a device connecting to the network via 3GPP, or any device without a 5G radio (such as the computing device 100) that communicates via wireless communications with the access point 214 in order to interact with a public or private network.

In some aspects, each of the devices 202, 204, 206, 208, and 210 may correspond to computing device 100 in FIG. 1. Thus, a device can include, for example, a display(s), a power source(s) (e.g., a battery), a data store(s), a speaker(s), memory, a buffer(s), a radio(s) and the like. In some implementations, for example, a device 202, 204, 206, 208, and 210 comprise a wireless or other device which can access a wireless telecommunication network through a platform architecture.

In some cases, devices 202, 204, 206, 208, and 210 in network environment 200 can optionally utilize one or more communication channels 212 to communicate with other computing devices (e.g., a mobile device(s), a server(s), a personal computer(s), etc.) through access point 214. The network environment 200 may be comprised of a telecommunications network(s), or a portion thereof. A telecommunications network might include an array of devices or components (e.g., one or more base stations), some of which are not shown. Those devices or components may form network environments similar to what is shown in FIG. 2, and may also perform methods in accordance with the present disclosure. Components such as terminals, links, and nodes (as well as other components) can provide connectivity in various implementations. Network environment 200 can include multiple networks, as well as being a network of networks, but is shown in more simple form so as to not obscure other aspects of the present disclosure.

The one or more communication channels 212 can be part of a telecommunication network that connects subscribers to their immediate telecommunications service provider (i.e., home network carrier). In some instances, the one or more communication channels 212 can be associated with a telecommunications provider that provides services (e.g., 3G network, 4G network, LTE network, 5G network, and the like) to devices such as UEs 202, 204, 206, 208, and 210. For example, the one or more communication channels may provide connectivity or data services to devices 202, 204, 206, 208, and 210, or corresponding users that are registered or subscribed to utilize the services provided by the telecommunications service provider. The one or more communication channels 212 can comprise, for example, a 1× circuit voice, a 3G network (e.g., CDMA, CDMA2000, WCDMA, GSM, UMTS), a 4G network (WiMAX, LTE, HSDPA), or a 5G network.

In some implementations, access point 214 is configured to communicate with a device, such as devices 202, 204, 206, 208, and 210, that are located within the geographic area, or cell, covered by radio antennas of access point 214. Access point 214 may include one or more base stations, base transmitter stations, radios, antennas, antenna arrays, power amplifiers, transmitters/receivers, digital signal processors, control electronics, GPS equipment, and the like. In particular, access point 214 may selectively communicate with the user devices using dynamic beamforming.

As shown, access point 214 is in communication with a platform architecture 230 and at least a network database 220 via a backhaul channel 216. As the devices 202, 204, 206, 208, and 210 collect individual status data, the status data can be automatically communicated by each of the devices 202, 204, 206, 208, and 210 to the access point 214. Access point 214 may store the data communicated by the devices 202, 204, 206, 208, and 210 at a network database 220. Alternatively, the access point 214 may automatically retrieve the status data from the devices 202, 204, 206, 208, and 210, and similarly store the data in the network database 220.

The platform architecture 230 comprises various architectural elements including a platform host operating system 232, a user application 234, a platform independent client framework 236, adapters 238, and platform IP security 240. Although the platform architecture 230 is shown as a single component comprising the platform host operating system 232, the user application 234, the platform independent client framework 236, the adapters 238, and the platform IP security 240, it is also contemplated that each of the platform host operating system 232, the user application 234, the platform independent client framework 236, and the adapters 238, and the platform IP security 240 may reside at different locations, be its own separate entity, and the like, within the home network carrier system.

The platform architecture 230 may be a common platform architecture such as those provided by Intel or ARM. The platform architecture 230 supports the platform host operating system 232, which interacts with the user application 234. The user application 234 interfaces with the platform independent client framework 236 and the adapters 238. The adapters 238 enable interoperability with different platform plug-ins and drivers. The adapters 238 are a setup type of adapter architecture that uses a shared encoding/decoding library. It associates the encoder/decoder with a specific target platform. The adapters interact with the platform IP security 240. Information about the status of each of the platform architecture sub-elements may also be displayed on display 242.

Figure 3:
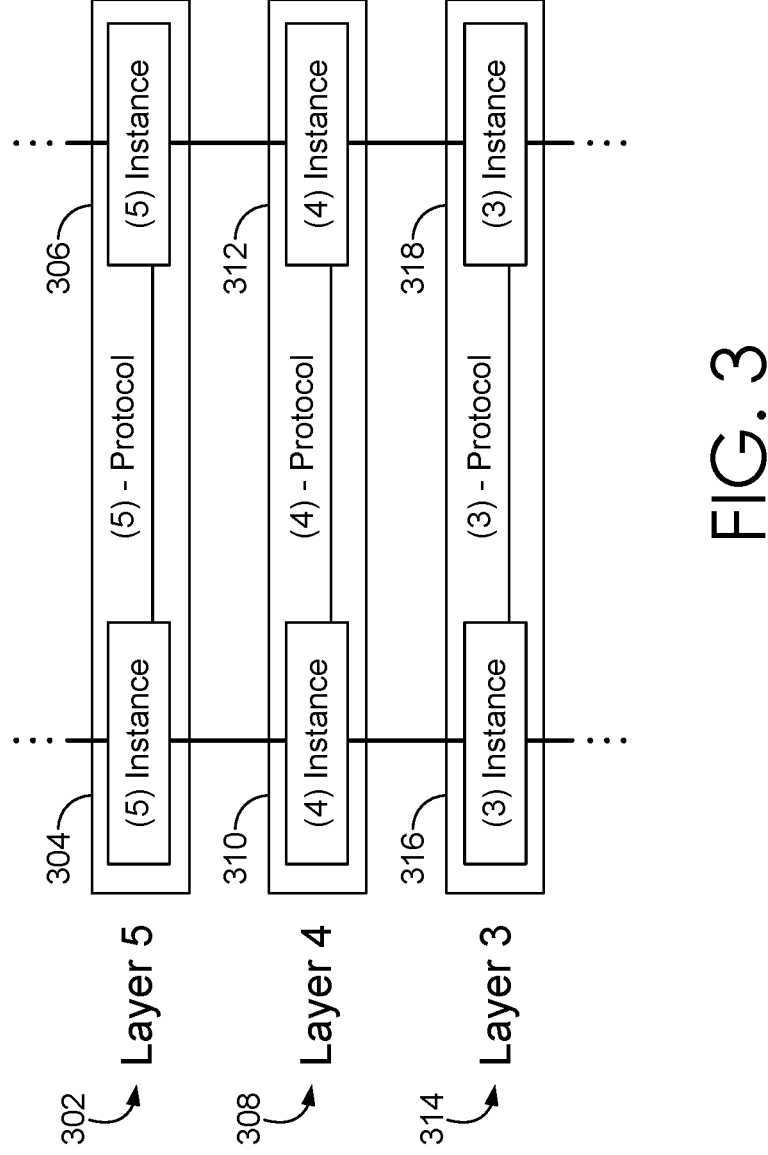
FIG. 3 depicts communication using multiple architecture layers in an interoperable communication network suitable for use in implementations of the present disclosure, in accordance with aspects herein.
Figure 3:
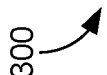

FIG. 3 depicts communication using multiple architecture layers in an interoperable communication network suitable for use in implementations of the present disclosure. The open systems interconnection model is a model the describes a universal standard of communication functions of a telecommunication system or computing system without regard of the system's underlying internal technology and specific protocol suites. The objective is to provide an interoperable communication system that uses standard communication protocols through the encapsulation and de-encapsulation of data for all networked communication.

The open systems interconnection model partitions the flow of data in a communication system into seven abstraction layers. The abstraction layers describe networked communication from the physical implementation of transmitting bits across a communications medium to the highest level representation of a distributed application. Each of the intermediate layers serves a class of functionality to the layer above it and in turn, it is served by the layer below it. Classes of functionality are realized in software development through standardized communication protocols.

Each layer in the model performs specific well defined functions and the functions of each layer communicate with and interact with the layers immediately above and below it, unless the layer does not have a layer below or above. The top and bottom layers only respond with one layer, either the layer below or above.

Layer 1 is the physical layer, which is responsible for the transmission and reception of unstructured raw data between a device, such as a network interface controller, Ethernet hub, or network switch, and a physical transmission medium. In operation, the physical layer converts the digital bits into electrical, radio or optical signals. Bit rate control is performed at the physical layer and may define transmission modes such as simplex, half duplex, and full duplex. In addition, the physical layer also specifies how encoding occurs over a physical signal, such as an electrical voltage or light pulse.

Layer 2 is the data link layer, which provides node-to-node data transfer. It detects and may correct errors occurring in the physical clear. In addition, the data link layer also defines the protocol to establish and terminate a connection between two physically connected devices. The link layer also defines the protocol for flow control between the two connected devices. The link layer may be divided into two sub-layers, the medium access control (MAC) layer and the logical link control (LLC). The MAC layer is responsible for controlling how devices in a network gain access to a medium and permission to transmit data. The LLC layer is responsible for identifying and encapsulating network layer protocols and also controls error checking and frame synchronization.

Layer 3, the network layer, provides the functional and procedural means of transferring packets from one node to another connected node in a different network. A network may be a medium to which many nodes can connect and on which every node has an address and which permits nodes connected to it to transfer messages to other connected nodes merely by providing the content of a message and the address of the destination node. The network determines the routing to deliver the message.

Layer 4, the transport layer, provides the functional and procedural means of transferring variable length data sequences from a source host to a destination host from one application to another across a network, while maintaining the quality of service functions. In addition, the transport layer also controls the reliability of a given link between a source and a destination host through flow control, error control, and acknowledgements of sequence and existence. Tunneling protocols may operate at the transport layer and may provide end-to-end encryption with IPsec. IPsec is a secure network protocol suite that authenticates and encrypts the packets of data to provide secure encrypted communication between two devices over an Internet Protocol network.

Layer 5, the session layer, acts to create the setup, control the connections, and also tear down the connection between two devices, which is known as a "session". Domain name service (DNS) and other name resolution protocols operate in the session layer. Common functions provided by the session layer include user logon, name lookup, and user logoff. Authentication protocols may also operate on the session layer. The session layer establishes, manages, and terminates the connections between the local and remote application and may also provide for full duplex, half duplex, or simplex operation.

Layer 6, the presentation layer, establishes data formatting and data transmission into the format specified by the application layer during the encapsulation of the outgoing messages while being passed down the protocol stack. Outgoing messages may be converted into a format specified by the application layer and incoming messages may be converted during de-encapsulation in a reverse process. The presentation layer handles protocol conversion, data, encryption, data decryption, data compression, data decompression, incompatibility of data representations between operating systems as well as graphic commands. The presentation layer transforms data into the form that the application layer accepts, Layer 7, the application layer interacts directly with the user and the software application that implements a component of communication between a client device and a server. The application programs may be directly integrated into the application layer.

In FIG. 3, an open systems interconnect communication layer system 300 illustrates communication across several layers. The session layer 302 sends a session layer transmit instance 304 using a protocol to another device, which receives the session layer receive instance 306. Similarly, transport layer 308 sends a transport layer transmit instance 310 to another device using a transport layer protocol, which receives the transport layer receive instance 312. The network layer 314 sends a network layer transmit instance 316 to another device, using a network layer protocol, which receives the network layer receive instance 318.

Figure 4:
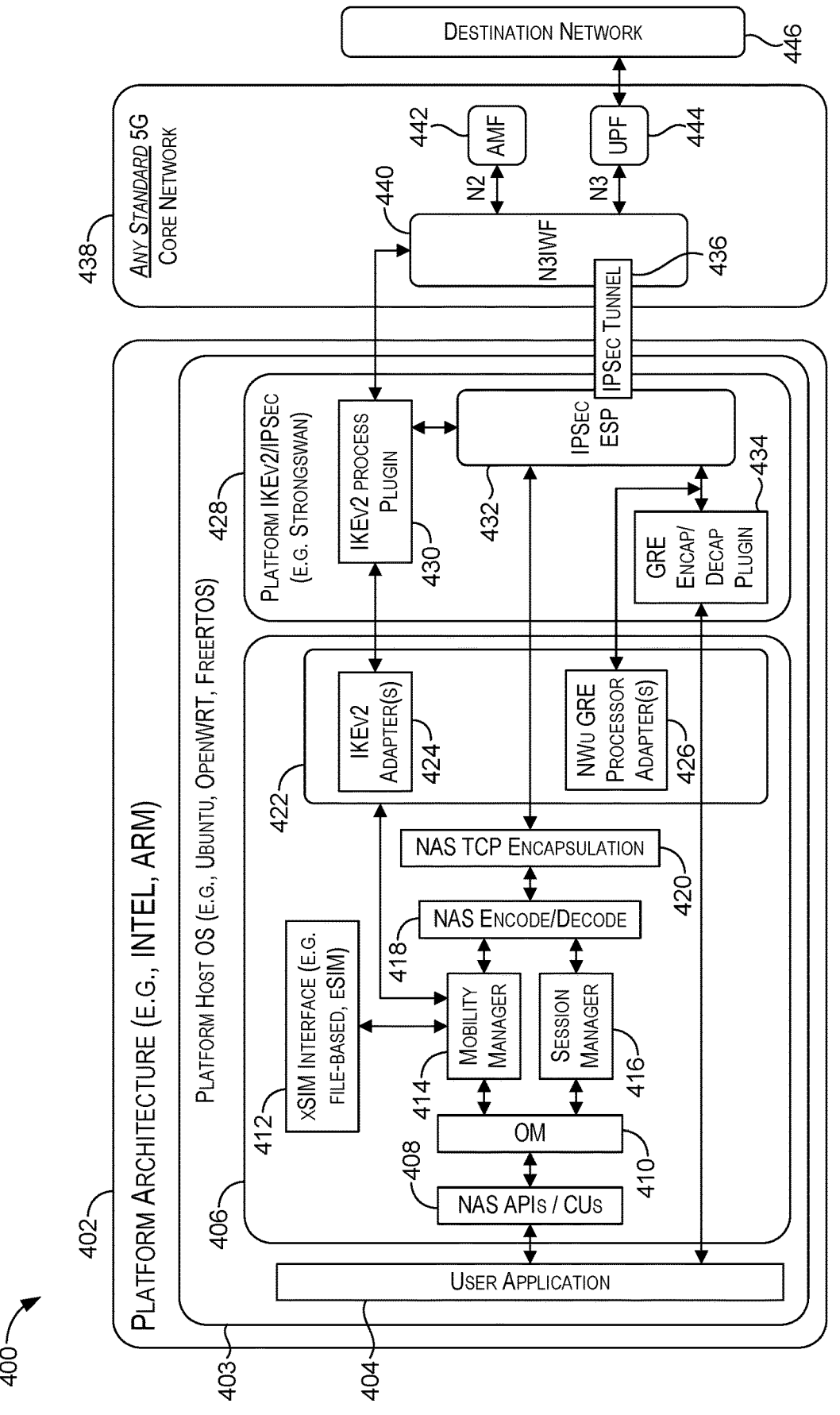
FIG. 4 illustrates a network incorporating a platform independent client framework software stack, suitable for use in implementations of the present disclosure, in accordance with aspects herein.

FIG. 4 illustrates a network incorporating a platform independent software stack suitable for use in implementations of the present disclosure. The network 400 includes a platform architecture 402. The platform architecture may be an Intel or ARM based architecture. The platform host operating system 403 interfaces with the platform architecture 402 and also with the platform independent client framework software stack 406 and platform security 428. In operation the platform host operating system 403 may be Ubuntu, Open WRT, FreeRTOS or similar operating systems that are compatible with the platform architecture.

The platform host operating system 403 also hosts at least one user application 404. The user application 404 may provide a variety of functionalities or operations to the platform host operating system 403. The user application is in communication with the platform independent client framework software stack 406. The platform independent client framework software stack 406 includes platform specific adapters 422 to allow interface and communication with particular platforms. All of the supported platform specific adapters 422 may be included with the platform independent client framework software stack 406. The specific adapters supported by the platform independent client framework software stack 406 are activated when the particular platform host operating system 403 is being used.

The platform independent client framework software stack 406 includes a network attached storage (NAS) 408 which includes application programming interface (API) and control unit (CU), and which interfaces with the user application 404 and the operations manager 410. Operations manager 410 is in communication with mobility manager 414 and session manager 416. The mobility manager 414 is also in communication with the subscriber identity module interface 412 and with NAS encoder/decoder 418. The NAS encoder/decoder 418 is also in communication with NAS transmission control protocol encapsulator 420.

The mobility manager 414 is also in communication with platform specific adapters 422. The platform specific adapters 422 include internet key exchange (IKEv2) adapters 424 and network generic routing encapsulation (GRE) adapters 426.

The platform independent client framework software stack 406 is in communication with platform security module 428. Platform security module 428 may operate using either the Ikev2 or internet protocol security (IPSec) security protocols. The IKEv2 adapters 424 can communicate with IKEv2 process plug in 430. The IKEv2 process plug in 430 is in communication with IP sec encapsulating security payload (ESP) 432. The IP sec ESP 432 is also in communication with NAS encoder/decoder 418, network GRE adapters 426, and GRE encapsulation/decapsulation plug in 434. The platform security module 428 provides encryption and authentication of the packets of data traveling through the 5G network to the destination network 446.

The platform security module 428 communicates with any standard 5G core network 438. The communication may use IP sec tunnel 436 or IKEv2 process plug in 424. Both the IKEv2 process plug in 424 and the IP sec tunnel 436 may be in communication with non-3GPP interworking function N3IWF 440. The N3IWF 440 is responsible for interworking between untrusted non-3GPP networks and the 5G core network 438.

The N3IWF 440 is in communication with access and mobility management function (AMF) 442 and also user plane function (UPF) 444. The UPF function is also in communication with destination network 446.

In operation, the platform specific adapters 422 enable interoperability with different platform plug ins that may be provided by different vendors. The platform specific adapters 422 are shared libraries that may be dynamically loaded. Only the software adapter of a particular target platform may be configured and enabled at a time. The IKE v2 adapters 424 and the network GRE adapters 426 create the compatibility with the different plug in types depending on the target platform, such a Ubuntu or FreeRTOS and well as with platform architecture 402, which may be either Intel or ARM. The architecture is a setup adapter type of architecture that uses a shared encoding/decoding library. It associates the encoder/decoder 418 with a specific target platform. For example, a Ubuntu operating system based Intel adapter for IKEv2 424 can be integrated with an IKEv2 process plug in 430 for that platform.

Platform security 428 provides support for IKEv2 processes, generic routing encapsulation (GRE) and internet protocol security encapsulating security payload (IPsec ESP). The IKEv2 adapter 424 works in conjunction with the IKEv2 process plug in 430. Similarly, the NWu GRE processor adapter 426 operates in conjunction with the IPsec ESP module 432. The IPsec ESP module 432 is also in communication with the NAS TCP encapsulation 420.

The platform specific adapters 422 can act as independent entities but may still form a part of the platform independent client framework software stack 406 framework. As shown in FIG. 4, each target software platform has a set of software adapters associated with that target platform. As an example, IKEv2 adapter 424 for the control plane may initiate the IKEv2 security association establishment procedure with the N3IWF 440 over the network interface using the IKEv2 protocol. The network GRE processor for the user for the device forwards the GRE packet to the NEIWF 440 using the IPsec child security association associate with the quality of service flow (QFI) in a 5G system, by encapsulating the GRE packet into an IPsec packet in tunnel mode with the source address as the device IP address and the destination address as the device IP address associated with the child security association.

FIG. 5 is a flow diagram of a method for connecting a device to a 5G network using the platform independent client framework, in accordance with aspects discussed herein. The method 500 begins with sending a connection request message from a device to a platform independent client framework in step 502. The device may be a device that does not include a 5G radio and may incorporate a 3GPP radio device. Upon receipt of the connection request, the platform independent client framework requests a platform specific adapter in step 504. The platform specific adapter may be designed to operate in a platform architecture, such as Intel or ARM and within that platform architecture to work within a platform host operating system. The platform host operating system may be similar to Ubuntu, OpenWRT, FreeRTOS, or similar operating system. Then, in step 506, the process continues with adapting the connection request message using the platform specific adapter to create an adapted message. After adapting, the method continues with encapsulating the adapted connection request message in a transmission control protocol (TCP) to create a TCP message. The method then continues with the TCP message in step 510 which provides for encapsulating the TCP message in an encapsulating security payload (ESP) to create an ESP message. After creating the ESP message, in step 512, transmitting the ESP message to a 5G network using an internet protocol security (IPsec) tunnel between the 5G network and a platform architecture. This method provides the enhanced security of the 5G network to the non-5G device.

Accordingly, according to the aspects herein, a platform independent client framework, or universal software stack, is provided that enables networks to use common platform architectures, such as Intel or ARM in conjunction with multiple platform host operating systems. The platform host operating systems may include: Ubuntu, OpenWRT, FreeR-TOS, and similar operating systems. The platform independent client framework works in conjunction with platform specific plug ins to facilitate 5G network connectivity, with any standard 5G network. A number of advantages are provided, in particular, improved security when using non-5G devices, such as 3GPP devices, in an internet-of-thing (IoT) setting.

Many different arrangements of the various components depicted, as well as components not shown, are possible without departing from the scope of the claims below. Embodiments of our technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

The invention claimed is:

1. A computer-implemented method for connecting to a 5G network, comprising:
at a platform independent client framework:
receiving a connection request message;
requesting a platform specific adapter from a plurality of platform specific adapters, wherein each platform specific adapter is specific to one of a plurality of host operating systems;
adapting the connection request message using the platform specific adapter specific to a first host operating system to create an adapted connection request message;
encapsulating the adapted connection request message in a transmission control protocol (TCP) to create a TCP message;
encapsulating the TCP message in an encapsulating security payload (ESP) to create an ESP message; and

transmitting the ESP message to the 5G network using an internet protocol security (IPsec) tunnel.

2. The computer-implemented method of claim 1, wherein the connection request message is received from a non-5G device.

3. The computer-implemented method of claim 1, wherein a platform independent client framework incorporates the platform specific adapter.

4. The computer-implemented method of claim 3, wherein the platform independent client framework incorporates multiple types of platform specific adapters each adapter supporting a different security protocol.

5. The computer-implemented method of claim 4, wherein the multiple security protocols include network generic routing encapsulation security protocol (NWu GRE) and an internet protocol security protocol (IKEv2).

6. The computer-implemented method of claim 1, wherein the platform specific adapter is in communication with a compatible process plug in.

7. The computer-implemented method of claim 1, wherein transmitting the ESP message to the 5G network transmits the message without using an IPsec tunnel.

8. A system for connecting to a 5G network, comprising:
one or more computer processing components comprising a platform independent client framework, the platform independent client framework configured to:
receive a connection request message;
request a platform specific adapter from a plurality of platform specific adapters, wherein each platform specific adapter is specific to one of a plurality of host operating systems;
adapt the connection request message using the platform specific adapter specific to a first host operating system to create an adapted connection request message;
encapsulate the adapted connection request message in a transmission control protocol (TCP) to create a TCP message;
encapsulate the TCP message in an encapsulating security payload (ESP) to create an ESP message; and
transmit the ESP message to the 5G network using an internet protocol security (IPsec) tunnel between the 5G network and the platform independent client framework.

9. The system of claim 8, wherein the connect request message is received from a non-5G device.

10. The system of claim 8, wherein the platform independent client framework incorporates multiple platform specific adapters.

11. The system of claim 10, wherein each adapter of the multiple specific adapters supports a different security protocol.

12. The security system of claim 11, wherein one of the security protocols is network generic routing encapsulation security protocol (NWu GRE).

13. The system of claim 11, wherein one of the security protocols is an internet security protocol (IKEv2).

14. The system of claim 8, wherein the platform specific adapter is in communication with a compatible process plug in.

15. The system of claim 8, wherein transmitting the ESP message to the 5G network transmits the message without using an IPsec tunnel.

16. A non-transitory computer storage media storing computer-useable instructions that, when used by one or more processors, cause the one or more processors, at a platform independent client framework to:
receive a connection request message;

request a platform specific adapter from a plurality of platform specific adapters, wherein each platform specific adapter is specific to one of a plurality of host operating systems;

create an adapted connection request message using the platform specific adapter specific to a first host operating system;

encapsulate the adapted connection request message to create a first encapsulated message;

encapsulate the first encapsulated message in an encapsulating security protocol to create a second encapsulated message; and transmitting the second encapsulated message to a 5G network.

17. The non-transitory computer readable media of claim 16, wherein the encapsulating security protocol is a network generic routing encapsulation security protocol (NWu GRE).

18. The non-transitory computer readable media of claim 16, wherein the encapsulating security protocol is an internet protocol security protocol (IPsec).

19. The non-transitory computer readable media of claim 16, wherein transmitting the second encapsulated message to a 5G network uses an internet protocol security protocol (IPsec) tunnel.

20. The non-transitory computer readable media of claim 16, wherein the platform specific adapter communicates with a compatible process plug in.

* * * * *